United States Patent
Hune et al.

(10) Patent No.: US 11,883,914 B2
(45) Date of Patent: Jan. 30, 2024

(54) CONTACT TIP FOR ARC WELDING WITH A CHANNEL HAVING A STELLATE, MULTI-LOBULAR CROSS-SECTION WITH CONVEXLY ROUNDED SIDES

(71) Applicant: KME Germany GmbH & Co. KG, Osnabrück (DE)

(72) Inventors: Carsten Hune, Wallenhorst (DE); Jörg Schönfeld, Ibbenbüren (DE); Frank Böert, Wallenhorst (DE); Reinhard Hintemann, Osnabrück (DE); Hans-Günter Wobker, Bramsche (DE); Stephan Meyer, Stemshorn (DE)

(73) Assignee: Cunova GmbH, Osnabrück (DE)

( * ) Notice: Subject to any disclaimer, the term of this patent is extended or adjusted under 35 U.S.C. 154(b) by 35 days.

(21) Appl. No.: 16/755,456

(22) PCT Filed: Oct. 8, 2018

(86) PCT No.: PCT/DE2018/100832
§ 371 (c)(1),
(2) Date: Apr. 10, 2020

(87) PCT Pub. No.: WO2019/072338
PCT Pub. Date: Apr. 18, 2019

(65) Prior Publication Data
US 2020/0238422 A1  Jul. 30, 2020

(30) Foreign Application Priority Data
Oct. 12, 2017 (DE) ............... 10 2017 123 749.6

(51) Int. Cl.
B23K 9/173 (2006.01)
B23K 9/29 (2006.01)
B23K 9/12 (2006.01)
B23K 9/26 (2006.01)

(52) U.S. Cl.
CPC ............. *B23K 9/173* (2013.01); *B23K 9/295* (2013.01); *B23K 9/123* (2013.01); *B23K 9/124* (2013.01); *B23K 9/26* (2013.01); *B65H 2701/36* (2013.01)

(58) Field of Classification Search
CPC .... B23K 26/1462; B23K 9/173; B23K 9/295; B23K 9/123; B23K 9/124; B23K 9/26
(Continued)

(56) References Cited

U.S. PATENT DOCUMENTS 3,240,233 A    3/1966 Johnston
3,716,902 A *  2/1973 Pearce ............... B21K 21/08
                                              29/890.02
(Continued)

FOREIGN PATENT DOCUMENTS

CA    2 856 212       5/2012
CN    1100019 A       3/1995
(Continued)

OTHER PUBLICATIONS

Machine translation of 102004008058 performed on Nov. 25, 2020.*
(Continued)

*Primary Examiner* — Tu B Hoang
*Assistant Examiner* — Alba T Rosario-Aponte
(74) *Attorney, Agent, or Firm* — Henry M. Feiereisen LLC

(57) ABSTRACT

The invention relates to a contact tip (1) for arc welding with at least one channel (2) passing through the contact tip (1) for receiving a welding wire (3), the channel (2) having a non-round stellate, multi-lobular cross-section with convexly rounded sides.

8 Claims, 3 Drawing Sheets

(58) Field of Classification Search
USPC .......................................... 219/137.61, 121.5
See application file for complete search history.

(56) References Cited

U.S. PATENT DOCUMENTS

| | | | | |
|---|---|---|---|---|
| 5,635,091 | A * | 6/1997 | Hori ...................... | B23K 9/123 |
| | | | | 219/137.61 |
| 8,878,098 | B2 * | 11/2014 | Cooper ................... | B23K 9/16 |
| | | | | 219/137.61 |
| 2011/0297657 | A1 * | 12/2011 | Kutsuna ................. | B23K 9/295 |
| | | | | 219/137.44 |
| 2012/0298629 | A1 | 11/2012 | Cooper et al. | |
| 2013/0240152 | A1 * | 9/2013 | Regan ................. | B29C 66/8322 |
| | | | | 156/580.1 |

FOREIGN PATENT DOCUMENTS

| | | | |
|---|---|---|---|
| CN | 2442781 | Y | 8/2001 |
| CN | 202667892 | | 1/2013 |
| CN | 202667892 | U * | 1/2013 |
| CN | 203853665 | U | 10/2014 |
| CN | 104959715 | A | 10/2015 |
| DE | 2 306 376 | | 8/1974 |
| DE | 199 04 348 | | 8/2000 |
| DE | 102004008058 | | 9/2005 |
| DE | 102004008058 | A1 * | 9/2005 |
| JP | H 08-206839 | | 8/1996 |
| JP | H1024373 | A | 1/1998 |
| WO | WO 2010/035964 | | 4/2010 |

OTHER PUBLICATIONS

Machine translation of CN 202667892 performed on Nov. 25, 2020.*
Material Datasheet of CuCrZr.*
International Search Report issued by the European Patent Office in International Application PCT/DE2018/100832.

* cited by examiner

CONTACT TIP FOR ARC WELDING WITH A CHANNEL HAVING A STELLATE, MULTI-LOBULAR CROSS-SECTION WITH CONVEXLY ROUNDED SIDES

CROSS-REFERENCES TO RELATED APPLICATIONS

This application is the U.S. National Stage of International Application No. PCT/DE2018/100832, filed Oct. 8, 2018, which designated the United States and has been published as international Publication No, WO 2019/072338 Al and which claims the priority of German Patent Application, Serial No. 10 2017 123 749.6, filed Oct. 12, 2017, pursuant to 35 U.S.C. 119(a)-(d).

BACKGROUND OF THE INVENTION

The invention relates to a contact tip for arc welding.

DE 10 2004 008 058 A1 discloses a current tip for welding and cutting torches with a straight wire guide channel for guiding a wire electrode. It has a 5-sided profile. A linear contacting of the round welding wire on at least two surfaces of the 5-sided profile is to be ensured, wherein the current load of the welding wire is lower and cross-sectional area achieved is greater than the comparable cross-sectional area of a round cross-section. The larger cross-sectional area is intended to prevent mechanical blockages of the inner bore, which can make the wire transport more difficult.

The underlying object of the invention is to further develop the contact tip in such a way that the risk of blockage is reduced even further without the current load increasing.

SUMMARY OF THE INVENTION

This object is achieved in a contact tip for arc welding with at least one channel passing through the contact tip for receiving a welding wire, wherein the channel has a non-round cross-section, wherein the channel is a stellate, multi-lobular cross-section with convexly rounded sides, wherein the basic shape of the channel is a polygon with at least 3 corners within which the channel is located, wherein the convexly rounded skies in the cross-section are at least partially circular arcs having a radius, wherein the center points of the circular arcs are located outside the polygon.

The subclaims relate to advantageous further embodiments of the invention.

The contact tip for arc welding according to the invention has at least one channel passing through the contact tip in the longitudinal direction. It is used to receive a welding wire which is supplied with current via the contact with the contact tip. The channel has a non-round cross-section. According to the invention, it is provided that the channel has the form of a stellate, multi-lobular cross-section with convexly rounded sides. The convexly rounded sides relate to the contour of the sides in the cross-section of the channel and not in the longitudinal section of the channel. Viewed in the longitudinal direction, the channel can taper in the shape of a funnel to its outlet end, Preferably, the cross-section remains the same. The channel can be straight or curved. However, in cross-section, it has at least one length section with convexly rounded sides.

The stellate, multi-lobular profile is based on the fact that the channel preferably has an odd number of rounded sides, in particular 3, 5, 7, . . . sides. Preferably, the multi-lobular profile has 5 sides.

Alternatively, the number of sides is even, wherein preferably 6 or more sides are present.

Preferably, all sides have the same length and shape, so that they are a rotationally symmetrical cross-sectional profile, in which adjacent sides can be mapped by rotation on themselves, The rotational symmetry facilitates production. It leads to a uniform loading of production tools for the production of such a contact tip, in particular if this is produced by the drawing method or extrusion method.

The convexly rounded sides are preferably entirely or at least partially circular in cross-section. In particular, all circular arcs have a radius which is approximately the same within the scope of production tolerances.

The basic shape of the channel is a polygon with at least three sides, preferably with five or more sides. The polygon is uniform and thus a triangle, pentagon or a corresponding polygon. The channel is located completely inside the polygon. Due to the convexly rounded sides, the cross-section of the channel does not completely fill the polygon. The cross-sectional area of the channel is therefore smaller than the cross-sectional area of the polygon.

The convexly rounded sides are not to be too strongly curved. In particular, the radius of the circular arcs is so large that the center point of the circular arcs lies radially outside the polygon.

As a result, relatively deep corners are created which can project into the corner region of the polygon. Thus, a lot of space, dirt and adhesions remains in the channel. The radius of the circular arcs or the entire dimensions of the polygon and of the channel are substantially oriented on the diameter of the welding wire. Within the scope of the invention, it is assumed that the welding wire has a circular cross-section.

The circular arcs have a length which is preferably at least 50% of the length of one side of the polygon, preferably at least 70% and preferably at least 90%. The circular arc can in particular also be longer than the side of the polygon.

The radius is preferably in a range of 0.5 to 4 mm. This is also in the range of the thicknesses of typical welding wires, which are guided with such a contact tip. An inner diameter of an inner circle of the contact tip must be greater than the wire diameter. The inner diameter is preferably approximately 15 to 20% greater than the wire diameter, The term "stellate" means that there are pockets which taper radially outwards in the corner regions. The pockets lie in the region of the corners of the polygon. They do not necessarily have to extend to the outer corner of the polygon. The pockets can also be rounded. The polygon is substantially determined by the courses of the convexly rounded sides and the notional intersection points of the convexly rounded sides. In this connection, stellate does not mean that the cross-section of the channel is in any way circular, but has tapers in the corner regions which are emphasized by the convexly rounded sides and widen radially inwards and decrease radially outwards.

Due to the often rounded internal geometry of the contact tip, multiple contacts result between the welding wire to be guided and the inside of the contact tip, i.e, with its rounded sides. In general, two skies of the multi-lobular profile are always in contact with the welding wire. The convex design of the multi-lobular profile leads to the fact that a welding wire of smaller diameter always moves to a corner of the multi-lobular profile. This means that, because of the smaller diameter, it moves away from the constriction towards the adjacent, likewise rounded side until it also bears against the second side. It is guided in the corner between these two sides. In contrast to pentagonal cross-sections, in which a wire, which is basically smaller in diameter, can oscillate between the adjacent left and the adjacent right side surface on a straight side surface, wherein the contact surface is reduced only on a single side in these torques of the oscillation, the welding wire tends to oscillate less in the case of convexly rounded sides and is held more strongly in a corner of the multi-lobular profile.

This is due to the fact that the wire would be in an unstable position on the convex surface and tend to come into a stable position to a greater extent. This effect is also attributable to the different diameters of the inner circle and the welding wire. The inner circle of the multi-lobular profile, i.e. the circular cross-section bounded by the side surfaces, is approximately 15 to 20% greater than the diameter of the welding wire, which is guided through the multi-lobular profile. In fact, the welding wire has more space inside the channel because it is predominantly located between the rounded sides, i.e. it runs within the corners, The region of the corners therefore also has a very particular significance.

In any case, clamping may occur in the corner region, According to the invention, the corners have a depth which makes it possible to initially pick up dirt and then also to remove it from the channel by the movement of the welding wire. In this case, it is less important that the corners have a specific cross-section. More important is that there is a sufficiently large cross-sectional area in the corners.

Preferably, the convexly rounded sides can have a central region and edge regions adjoining the central region, wherein the central regions are convexly rounded and the edge regions are designed as straight lines. In this case, it is not the entire side that is curved, but only its central region. Straight lines, in particular in the form of tangents, adjoin the curve, so that there is a continuous transition between the central region and the edge regions. The straight lines in the corner region cause the corners to be triangular, funnel-shaped and even relatively deep.

The central regions of the sides are preferably of such a width that the welding wire always comes into contact with the central regions, i.e. with the rounded regions of the sides. The radius of the rounded sides, or the rounded regions of the side, is/are preferably greater than the radius of the inner circle delimited by the sides. The radius of the rounded sides is therefore also greater than the radius of the welding wire.

The term "convexly rounded side" is therefore also to be understood as meaning that only a partial region of one side is convexly rounded and at least one further partial region can be formed from straight lines or straight sections. The predominant partial region is preferably convexly rounded.

In order to prevent dirt from becoming stuck in the corners, it can be provided that the pockets arranged between two adjacent sides of the multi-lobular profile are rounded in their lowest point. The term multi-lobular profile does not mean that the entire wall of the channel has to be rounded in cross-section. It is sufficient if the channel has a plurality of sides with rounded portions, each side not necessarily having to be completely rounded.

Due to the multiple convexly rounded course, there are corners in which pockets are formed which have a radially greater depth than the central regions of the convexly rounded sides. This is desired. The pockets in combination with the convexly rounded sides being about an enlargement of the corner region, so that dirt can be transported more effectively out of the contact tip. In the event of less dirt, an improved contact between the welding wire and the convexly rounded sides occurs at the same time.

The contact tip according to the invention is preferably produced in the extrusion process and/or by a drawing process, i.e. as a drawing profile. During the drawing, a hollow profile is drawn over a mandrel in order to produce the desired inner contour of the channel, The drawing can be carried out in one or a plurality of drawing steps in a progressive approach to the end contour.

The contact tip preferably is made of copper or a copper alloy. It is considered advantageous if the contact tip is produced from a cold-drawn material, preferably from CuCrZr at a hardness of from 155 to 190 HBW. In a further advantageous exemplary embodiment, the contact tip is made of a composite material. The tip can be made of CuCrZr or CuCoBe on the inside. On the outside, the tip is made of a different copper alloy or of copper.

The invention combines the advantages of improved guidance and contacting of the welding wire with the advantages of an improved accommodation possibility for dirt. As a result, the contact between the wire and the contact tip is improved with respect to linearly straight polygonal traverses and the operational reliability is increased.

BRIEF DESCRIPTION OF THE DRAWING

The invention is explained in more detail below with reference to exemplary embodiments shown schematically in the drawings.

DETAILED DESCRIPTION OF PREFERRED EMBODIMENTS

Figure 1:
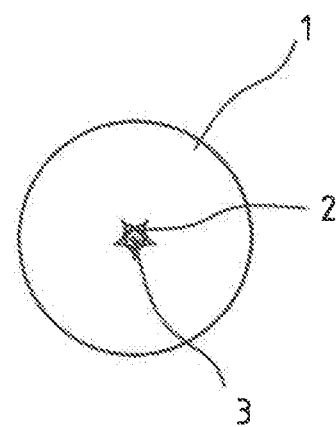
FIG. 1 shows an enlarged view of a cross-section through a contact tip for arc welding.

FIG. 1 shows an enlarged view of a contact tip for arc welding in cross-sectional representation. The contact tip 1 has, on the outside, a cylindrical cross-section and, centrally, a channel 2, passing through in the longitudinal direction of the cylinder, for receiving a welding wire 3. In the invention, the design of the channel 2 is decisive. It is shown greatly enlarged in the following figures.

Figure 2:
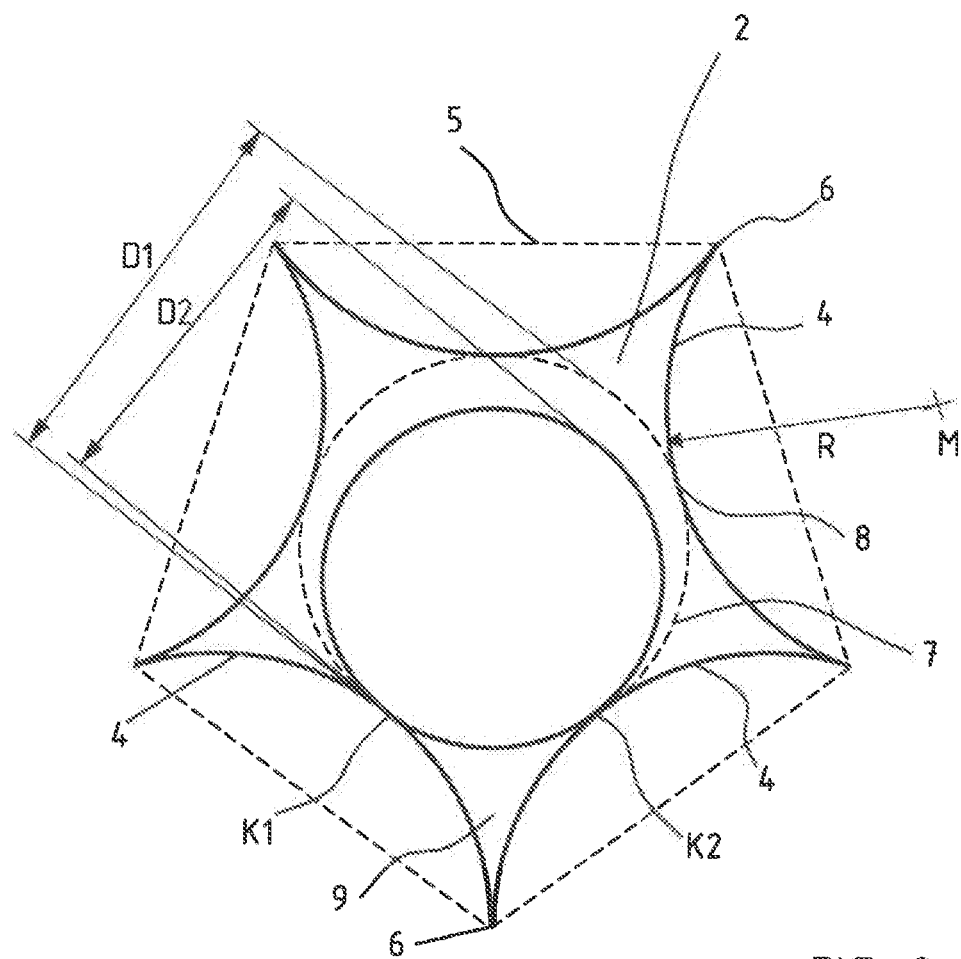
FIG. 2 shows an enlarged view of the central channel of FIG. 1 in cross-section.

FIG. 2 shows that the channel does not have a circular cross-section, but rather the shape of a stellate multi-lobular profile with convexly rounded sides 4. The basic shape of the channel 2 is a pentagonal polygon 5, which is drawn with a dashed auxiliary line. The channel 2 is located inside the polygon 5, and the respectively convexly rounded sides 4 are all identically configured. They are formed by circular arcs which have an approximately identical radius R. The center points M of the respective circular arcs with the radius R are located radially outside the polygon 5. In this exemplary embodiment, the radius R is selected such that the sides 4 meet exactly at a corner point 6 of the polygon 5 or of the channel 2, without cutting beforehand. As a result, an inner circle 7 is defined, which touches the five substantially identically configured sides 4 at innermost points 8 of the sides 4. It has a diameter D1. A welding wire 3 with the smaller diameter is located inside the channel 2. The diameter D1 of the inner circle 7 is approximately 15 to 20% larger than the diameter D2 of the welding wire 3.

The welding wire 3 lies on the lower two sides 4 in the image plane. A line contact takes place at the contact points K1 and K2. Since the diameter D2 of the welding wire 3 is smaller than the diameter D1 of the inner circle 7, the welding wire 3 can assume different positions, but is always pushed into one of the corners 6.

Due to the convexly shaped side walls 4, adjacent to each corner 6 there is a pocket 9 which tapers in the shape of a funnel. This pocket $ is relatively deep and makes it possible to absorb wear and dirt. The stellate channel 2 can therefore absorb relatively abundant dirt in its five pockets 9 without the movement of the welding wire 3 being impeded in the longitudinal direction. Production of such pockets 9 by shaping processes is possible in terms of production technology.

Figure 3:
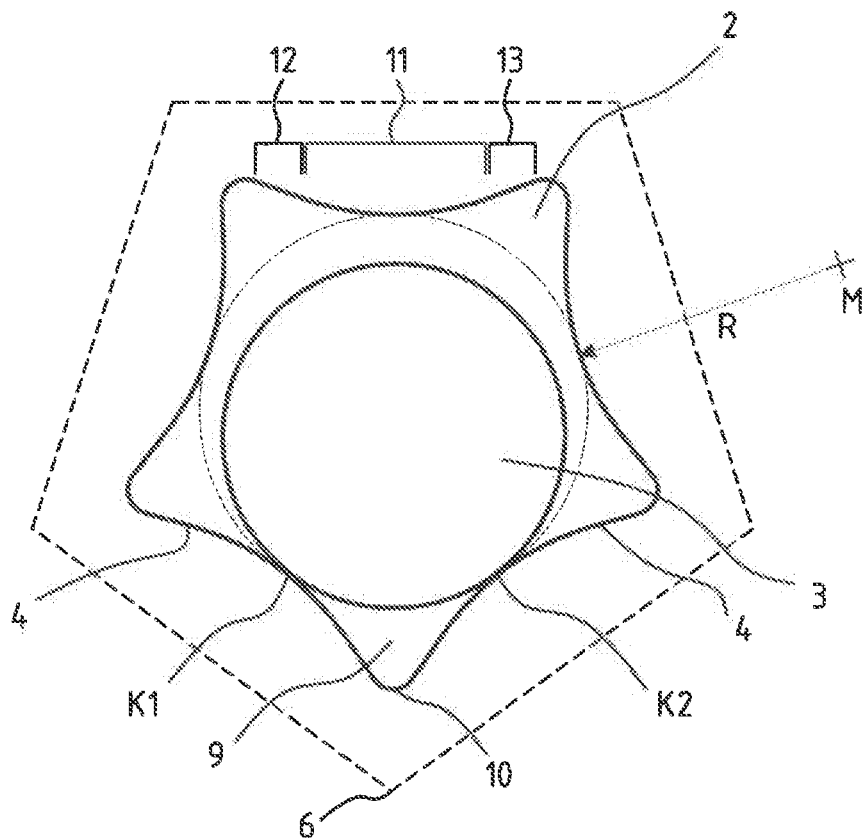
FIG. 3 shows a further embodiment of the channel in cross-section.

The pockets 9 do not necessarily have to reach up to the outer corner points of the circumscribed polygon 5. FIG. 3 shows an exemplary embodiment in which the radius R of the convex side 4 is selected identically to the exemplary embodiment of FIG. 1. The pockets 9 are not, however, tapered, but are rounded at their lowest points 10 pointing towards the corners 6 of the polygon 5. The volume of the pockets 9 is thereby slightly smaller, but production is simpler. In addition, stress peaks in the very pointed pockets of FIG. 2 are avoided. As a result of the radius R, such a multi-lobular profile also has convexly rounded sides 4. In this embodiment, however, the convex shape is additionally supplemented by straight lines. Each side 4 has a central region 11, which is designed as a circular arc corresponding to the radius R. Approximately identical edge regions 12, 13, which are designed as tangential straight lines, adjoin the central region 11. The edge regions 12, 13 are each shorter than the central region 11, The combination of curved central regions 11 and straight edge regions 12, 13 does not change at the function of the pockets 9. However, the design of the pockets 9 is geometrically simpler. FIG. 3 also shows that the contact points K1, K2 of the welding wire 3 of the sides 4 do not lie in the region of the straight line, but in the respective central region 11, so that the welding wire 3 is positioned in its movement within the channel 2 in exactly the same way as in the exemplary embodiment of FIG. 2.

Figure 4:
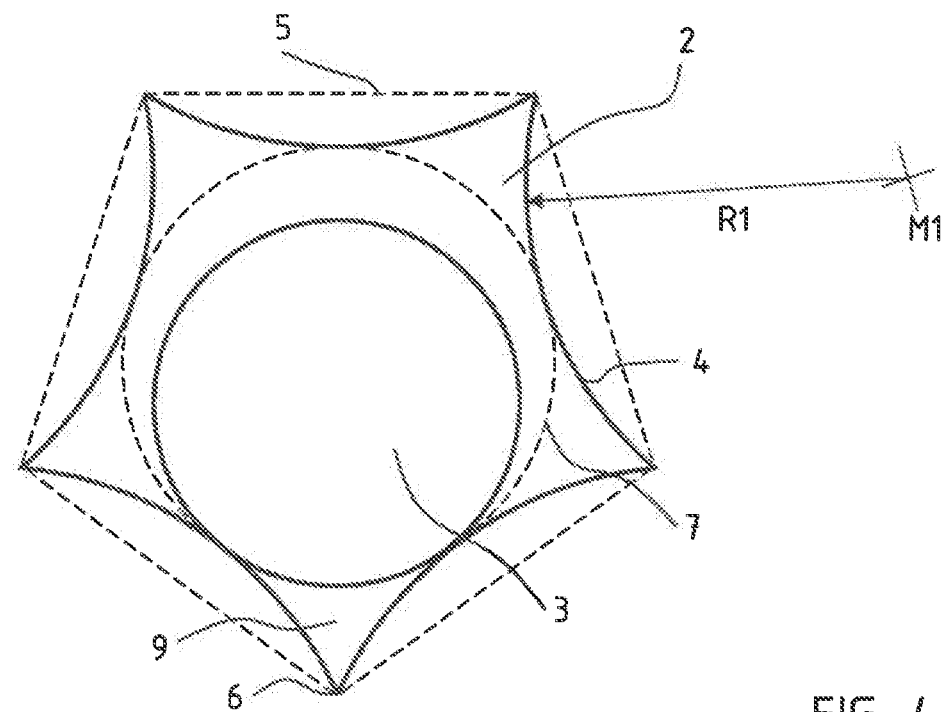
FIG. 4 shows a third embodiment of a channel in cross-section.

FIG. 4 shows a modification of a channel 2, in which the sides 4 are produced with a larger radius R1. The center point M1 is still located further radially outside the polygon 5. The curvature of the sides 4 is thereby less strong. The inner circle 7 is slightly larger, so that the welding wire 3 can be displaced further in the direction of the corners 6 of the stellate polygon 5. Overall, the cross-sectional area of the channel 2 is thus greater. As a result, the pockets 9 are somewhat less deep but wider for this purpose. In absolute terms, the cross-sectional area of a pocket 9 is thereby not smaller, but can be set similarly large, as with a smaller selected radius R of one side 4.

Figure 5:
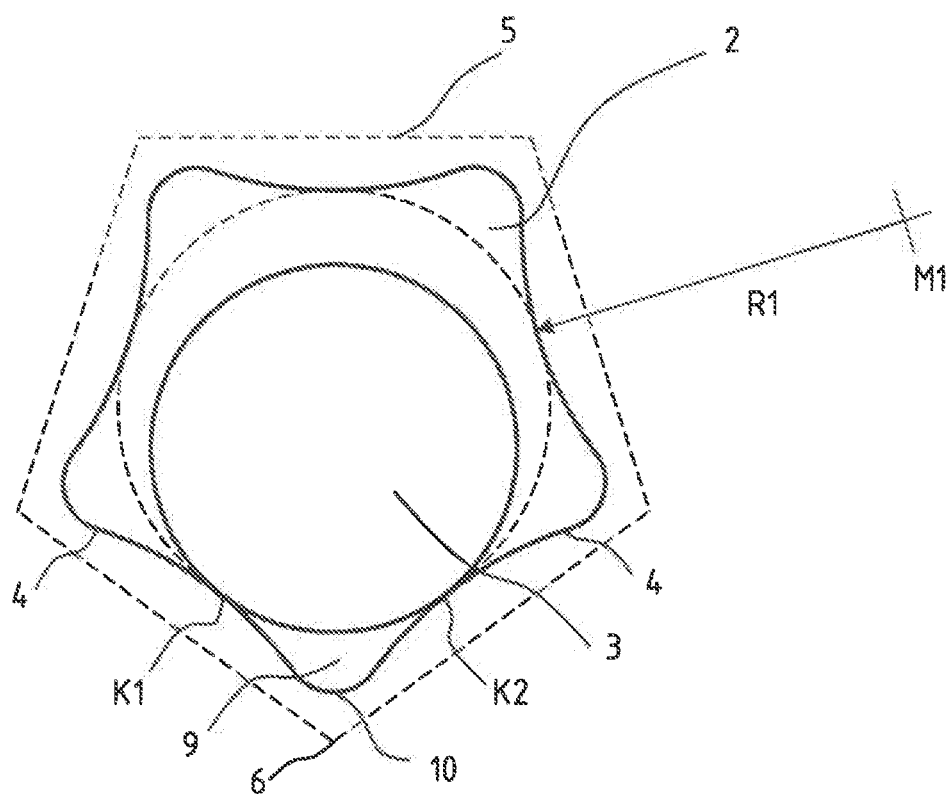
FIG. 5 shows a fourth embodiment of a channel in cross-section.

FIG. 5 shows, analogously to FIG. 3, the exemplary embodiment of FIG. 4 with rounded pockets 9. It can be seen that here too the cross-sectional area of the pockets 9 is reduced only minimally, but the stellate multi-lobular profile has softer contours overall, so that fewer stress peaks are present within the pockets 9, in particular in the region of the deepest 10 of the channel 2 or of the circumscribing polygon 5. Such a channel 2 is easier to produce in particular in the drawing process than channels 2 with very sharp corners 6 and very deep pockets 9. As also in the case of the exemplary embodiment of FIG. 3, nothing changes as a result of the rounding of the tips of the pockets 9 to the contact behavior of the welding wire 3 on the sides 4. It is still guided in line contact over the contact points K1, K2 within the channel 2.

The invention claimed is:

1. A contact tip for arc welding, comprising a channel passing through the contact tip for receiving a welding wire and having a crosssection which is non-round and has in cross-section a stellate, multilobular profile with convexly rounded sides and at least 5 corners which define corners of an imaginary polygon, said convexly rounded sides being configured in crosssection at least partially as circular arcs which are defined by a radius which extends from a center point located outside the polygon, said convexly rounded &des including a central region which is convexly rounded, and edge regions adjoining the central region tangentially and configured as straight lines, said edge regions being sized each shorter than the central region wherein pockets, which are rounded in their lowest point, are arranged between adjacent convexly rounded sides of the multi-lobular profile, wherein the radius is in a range from 0.5 to 4 mm, the rounded sides of the multilobular profile define radially innermost points which delimit an inner circle defined by a diameter which is greater by 15 to 20% than a diameter of the welding wire, and the radius of the circular arcs is greater than a radius of the inner circle.

2. The, contact tip of claim 1, wherein the multi-lobular profile has an odd number of at least 5 rounded sides.

3. The. contact tip of claim 1, wherein the radius of circular arcs is substantially identical within the scope of production tolerances.

4. The. contact tip of claim 1, wherein the contact tip is an extruded profile or a drawing profile.

5. The. contact tip of claim 1, wherein the contact tip is made of a cold-drawn material.

6. The. contact tip of claim 1, wherein the contact tip is made of copper or a copper alloy.

7. The. contact tip of claim 1, wherein the contact tip is made of CuCrZr and has a hardness of 155-190 BHW.

8. The. contact tip of claim 1, wherein the contact tip is made of CuCrZr or CuCoBe on an inside and made of a different copper alloy or of copper on an outside.

* * * * *

UNITED STATES PATENT AND TRADEMARK OFFICE
CERTIFICATE OF CORRECTION

PATENT NO. : 11,883,914 B2
APPLICATION NO. : 16/755456
DATED : January 30, 2024
INVENTOR(S) : Carsten Hune et al.

Page 1 of 1

It is certified that error appears in the above-identified patent and that said Letters Patent is hereby corrected as shown below:

In the Claims
In Column 6, Claim 1, Line 24 replace "&des" with --sides--.

Signed and Sealed this
Twenty-sixth Day of March, 2024

*Katherine Kelly Vidal*

Katherine Kelly Vidal
*Director of the United States Patent and Trademark Office*